UNITED STATES PATENT OFFICE.

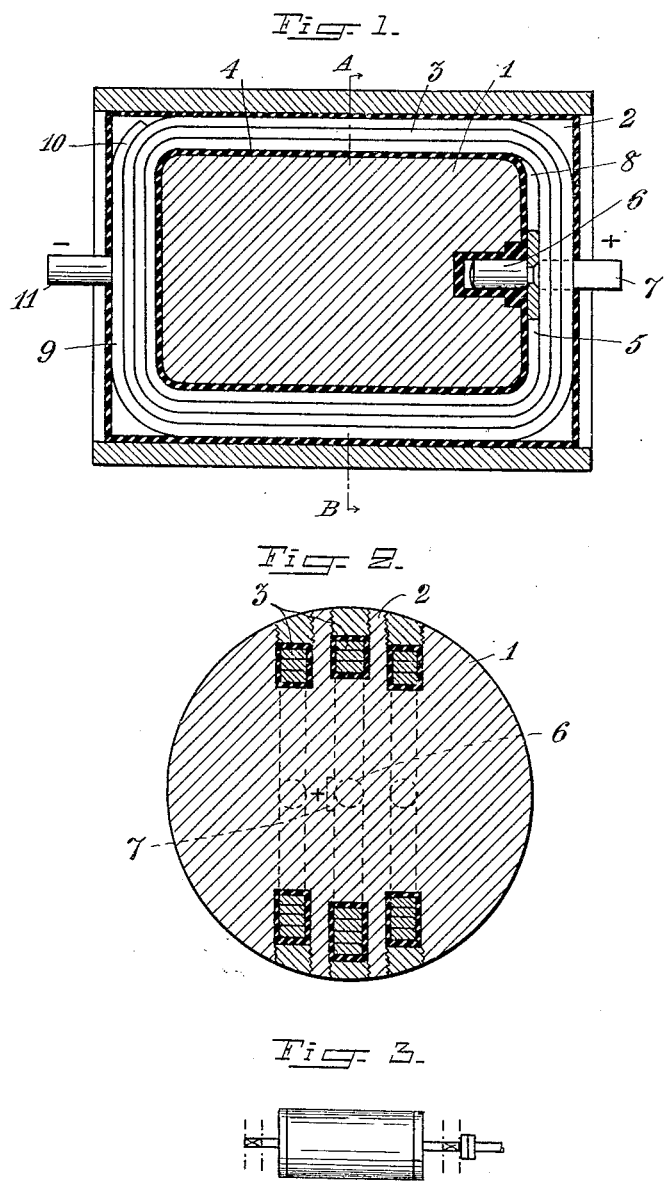

BIRGER LJUNGSTRÖM, OF STOCKHOLM, AND FREDRIK LJUNGSTRÖM, OF BREVIK, LIDINGÖN, SWEDEN.

ROTATING FIELD-MAGNET.

1,273,511. Specification of Letters Patent. Patented July 23, 1918.

Application filed January 19, 1918. Serial No. 212,771.

*To all whom it may concern:*

Be it known that we, BIRGER LJUNGSTRÖM, director, and FREDRIK LJUNGSTRÖM, chief engineer, subjects of the King of Sweden, residing at Narvavägen 21, Stockholm, Sweden, and Brevik, Lidingön, Sweden, have invented certain new and useful Improvements in Rotating Field-Magnets, of which the following is a specification.

In rotating field-magnets running with high speed the windings are actuated by considerable centrifugal forces, which particularly may prejudicially affect the terminal connections of the conductors so as to cause displacements of the conductors and stresses in the insulating material, which may give rise to electrical defects. The present invention relates to an improvement of such magnets and particularly magnets provided with parallel slots and has for its object to overcome said disadvantages.

In rotors of the kind mentioned the terminals of the inner and outer ends of the conductors are provided in the same slot preferably at the smallest possible distance from the shaft of the rotor where the centrifugal stresses are a minimum. The ends of the conductors will then be located in the end slot on one or the other side of the rotating magnet. Due to this fact the centrifugal forces will actuate the end of the conductor in one direction only. According to the present invention the conductor is prolonged beyond said point across the end of the magnet so that the centrifugal forces are counterbalanced.

In order to further ascertain a fixed position of the conductor, particularly the inner turn of the same, during the winding operation, when the conductor is firmly stretched, as well as after the winding has been completed to prevent displacements due to varying temperature, the inner end of the conductor is fastened to the bottom of the slot in a suitable way according to this invention as will be described hereinafter in connection with an embodiment of the invention.

The accompanying drawing illustrates an embodiment of the invention. Figure 1 shows a longitudinal section of a rotor with a device according to the present invention, Fig. 2 a cross-section on the line A—B in Fig. 1 and Fig. 3 a schematical side view of the rotor. The same designations refer to the same parts in the different figures.

1 designates the core of the rotor which in the example shown is provided with three slots 2. The winding 3 in each slot is surrounded by insulation 4. The innermost turn 5 of the winding is fastened to the iron core 1 by means of a pin 6 insulated from the iron and preferably riveted to the conductor. By this arrangement full security against a displacement of the terminal 7 is obtained. The inner turn has an extension 8 extending beyond the fastening point at the pin 6 for the purpose mentioned above. The outer turn 9 has a corresponding extension 10. 11 is the terminal of the outer turn.

If the terminal of the inner turn is made sufficiently stiff and arranged to firmly engage grooves in the side walls of the slot provided with insulation of mica, the terminal itself may serve the same purpose as said projection of the conductor.

Claims:

1. A rotating magnet provided with a series of slots, conductors wound in said slots and terminals for each of said conductors, each end of each conductor being extended for some distance in its slot beyond the proximate terminal, such terminal being close to the axis of rotation of the magnet, for the purpose set forth.

2. A rotating magnet provided with a slot and a conductor wound therein forming several convolutions and provided with projecting terminals, the innermost convolution having its ends extended in the slot beyond the proximate terminal, such terminal being close to the axis of rotation of the magnet for the purpose set forth.

3. A rotating magnet provided with a slot having a recess connecting therewith, and a conductor wound in said slot and having terminals, its inner end being extended in the slot beyond the proximate terminal, the inner convolution of said conductor being provided with a part to engage said recess.

4. A rotating magnet having a series of slots, and conductors wound in successive convolutions therein and terminals for said conductors at the axis of rotation, the inner and outer convolutions of each conductor being extended in the slot beyond the proximate terminal and each inner winding being provided with a part arranged to engage a recess in the magnet core near the axis of rotation for the purpose set forth.

In testimony whereof we affix our signatures in presence of two witneses.

BIRGER LJUNGSTRÖM.
FREDRIK LJUNGSTRÖM.

Witnesses:
JACOB BAGGE,
JAMES E. HALLEN.

Copies of this patent may be obtained for five cents each, by addressing the "Commissioner of Patents, Washington, D. C."